United States Patent [19]
Hirano et al.

[11] Patent Number: 5,938,889
[45] Date of Patent: Aug. 17, 1999

[54] TAPE FEEDING APPARATUS

[75] Inventors: Toru Hirano; Keisuke Kaiho, both of Tokyo, Japan

[73] Assignee: Atena Corporation, Tokyo, Japan

[21] Appl. No.: 08/817,175

[22] PCT Filed: Aug. 22, 1996

[86] PCT No.: PCT/JP96/02351

§ 371 Date: May 9, 1997

§ 102(e) Date: May 9, 1997

[87] PCT Pub. No.: WO97/08675

PCT Pub. Date: Mar. 6, 1997

[30]   Foreign Application Priority Data

Aug. 22, 1995 [JP] Japan .................................. 7-213344

[51] Int. Cl.[6] ...................................................... B32B 31/00
[52] U.S. Cl. ...................... 156/540; 156/247; 156/353; 156/510; 83/922
[58] Field of Search ................................. 156/540, 541, 156/247, 353, 238, 510; 83/746, 145, 922, 697

[56]   References Cited

U.S. PATENT DOCUMENTS

| | | | |
|---|---|---|---|
| 2,010,009 | 8/1935 | Brightwell | ............................. 83/697 |
| 2,379,682 | 7/1945 | Colucci et al. | ........................... 83/145 |
| 3,304,825 | 2/1967 | Preusser | .............................. 156/353 X |
| 3,527,633 | 9/1970 | Bertoglo | .................................. 156/353 |
| 3,893,714 | 7/1975 | Paulson et al. | ...................... 156/247 X |

FOREIGN PATENT DOCUMENTS

| | | |
|---|---|---|
| 3-148692 | 6/1991 | Japan . |
| 7-270556 | 10/1995 | Japan . |

*Primary Examiner*—James Engel
*Attorney, Agent, or Firm*—Oblon, Spivak, McClelland, Maier & Neustadt, P.C.

[57]   ABSTRACT

A tape feeding apparatus capable of feeding a tape laminate made by superposing a first tape having a first chemical material layer on one side and a second tape having a second chemical material layer on one side reacting with the first chemical material with the layers in contact with each other. When the chemical reaction occurs between them, the second chemical material layer exhibits an indication which is visually recognized. Rollers press the first tape drawn out from a first reel and the second tape drawn out from a second reel so that the first and second chemical material layers come in mutual contact, and form the tape laminate.

11 Claims, 15 Drawing Sheets

TAPE FEEDING APPARATUS

TECHNICAL FIELD

The present invention relates to a tape feeding apparatus. To be more specific, the present invention relates to a tape feeding apparatus that is suited for performing tape feed by laminating a first tape having a first chemical material layer on one surface and a second tape having a second chemical material layer on one surface which, upon being placed in contact with each other, generates a chemical reaction by laminating them in such a manner.

BACKGROUND ART

It has been a generally practiced procedure to indicate a valid period or a date of production as a means of indicating the length of time a product is effective, either on the product itself or on the packaging of, for instance, food products such as frozen food products, refrigerated food products, perishable food products, chemical products such as paints, glues and the like. However, the actual valid period for these products changes greatly depending upon how they are stored after they are produced; specifically, at what temperature and for how long. For instance, if such a product is stored in a freezer or refrigerator, the valid period is greatly lengthened compared to a case in which it is stored at room temperature.

This means that in the conventional method, in which either an absolute "best before" date is set for a product or the date of production is indicated without taking into consideration the storage temperature conditions or the length of storage at specific temperatures, the actual valid period can not be accurately indicated.

As a technology that addresses the problem, a tape constituted by combining a first tape provided with a chemical material layer on one surface and a second tape provided with a chemical material layer on one surface which, upon being placed in contact with the chemical material layer on the first tape, generates a chemical reaction to indicate a temperature/time integrated value starting from the time when the two chemical material layers come in contact with each other, has been proposed, although the technology has not yet become publicly known.

Through this technology, the point in time at which the chemical material layers on the two tapes come in contact with each other is set as the starting point for time measurement, and the temperature/time integrated value which is determined by the product of the time elapsing from the starting point for time measurement and the history of temperatures under which the product has been stored during that period of time can be indicated with color. Consequently, the actual valid period can be indicated extremely accurately.

However, the technology for placing two different types of tape in contact with each other, which is essential for the application of this technology, has not yet been developed.

DISCLOSURE OF THE INVENTION

It is an object of the present invention to provide a tape feeding apparatus that is capable of holding a first tape provided with a chemical material layer on one surface and a second tape provided with a chemical material layer on one surface which, upon being placed in contact with the chemical material layer of the first tape, generates a chemical reaction on one surface and does not cause the chemical reaction while the tape is in an unused state.

It is a further object of the present invention to provide a tape feeding apparatus that is capable of feeding out a tape laminate that is achieved by laminating the first tape and the second tape with the two chemical material layers on the tapes being placed in contact with each other during this feed operation.

It is a still further object of the present invention to provide a tape feeding apparatus that is capable of feeding out a tape laminate that indicates a temperature/time integrated value, the starting point for which is the time point at which the two chemical material layers applied to the first tape and the second tape come in contact with each other.

It is a still further object of the present invention to provide a tape feeding apparatus capable of feeding out a tape laminate, upon which an indication resulting from the chemical reaction between the two chemical material layers can be visually checked from the outside through the first tape while it is adhered to a product.

In order to achieve the objects described above, the tape feeding apparatus according to the present invention comprises a first means for tape holding, a second means for tape holding and a means for tape joining. The first means for tape holding holds a first tape. The first tape is provided with a first chemical material layer on one surface of a transparent supporting body.

The second means for tape holding holds a second tape. The second tape is provided with a second chemical material layer on one surface of a supporting body, this layer having characteristics whereby it generates a chemical reaction when it is placed in contact with the first chemical material layer, thereby producing an indication that can be visually checked.

The means for tape joining presses and bonds the first tape, drawn out from the first means for tape holding, and the second tape, drawn out from the second means for tape holding, in such a manner that the first chemical material layer and the second chemical material layer come in contact with each other, thereby forming a tape laminate.

Since the first means for tape holding holds the first tape and the second means for tape holding holds the second tape, the first tape provided with a chemical material layer on one surface and the second tape provided with the chemical material layer on one surface that generates a chemical reaction upon being placed in contact with the chemical material layer of the first tape can be held when the apparatus is not operating, without causing the chemical reaction.

The means for tape joining presses and bonds the first tape, drawn out from the first means for tape holding, and the second tape, drawn out from the second means for tape holding, in such a manner that the first chemical material layer and the second chemical material layer come in contact with each other, thereby forming a tape laminate. As a result, during use, the tape laminate, which achieves a state in which the first tape and the second tape are laminated with the two chemical substances being placed in contact with each other, can be fed out.

The supporting body in the first tape is transparent and the second chemical material layer provided at the second tape has characteristics whereby a chemical reaction occurs when it is placed in contact with the first chemical material layer to produce an indication that can be visually checked. Thus, the indication resulting from the chemical reaction between the two chemical material layers can be visually checked from the outside through the first tape while it is adhered to a product.

Other objects, structural features and advantages of the present invention are explained in further detail by referring to the drawings which are attached in order to show preferred embodiments.

BEST MODE FOR CARRYING OUT THE INVENTION

Figure 1:
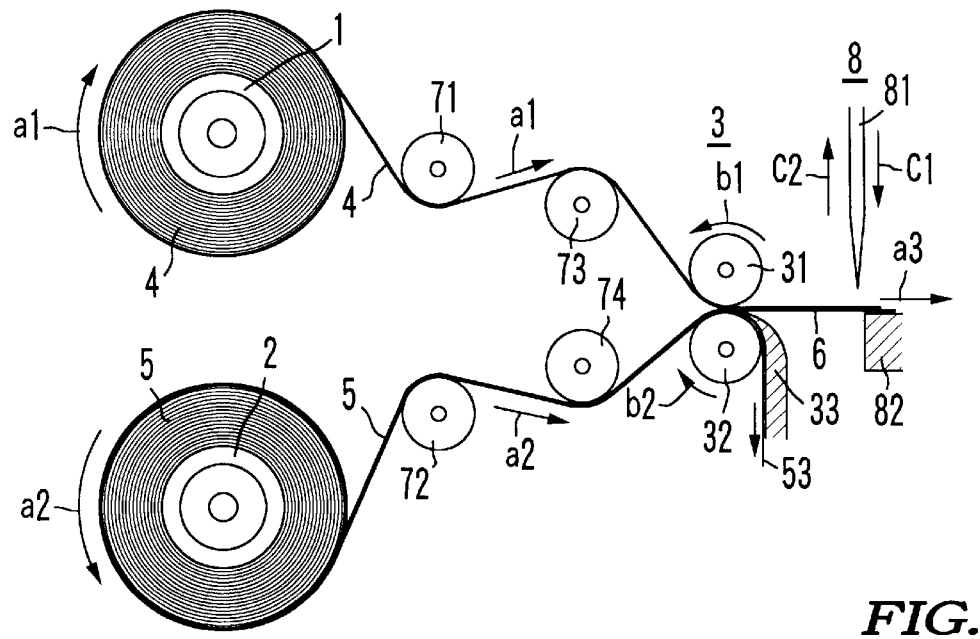
FIG. 1 is a schematic diagram of the tape feeding apparatus according to the present invention.
Figure 2:
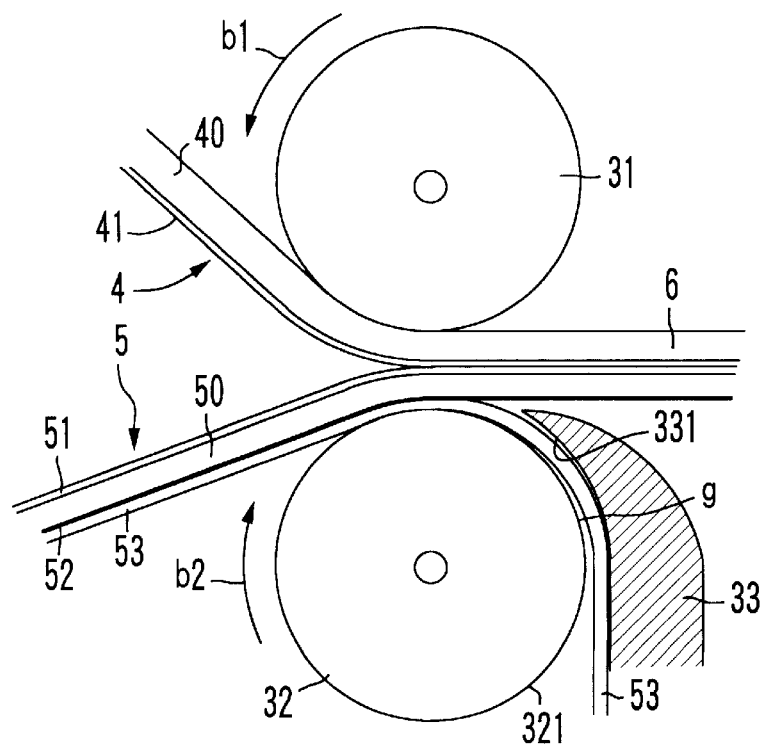
FIG. 2 is an enlargement of the means for tape joining in the tape feeding apparatus according to the present invention shown in FIG. 1.

In reference to FIGS. 1 and 2, the tape feeding apparatus according to the present invention includes a first reel 1 to constitute a first means for tape holding, a second reel 2 to constitute a second means for tape holding and rollers 31 and 32 to constitute a means for tape joining. The first reel 1 holds a first tape 4. The first tape 4 is provided with a first chemical material layer 41 on one surface of a transparent supporting body 40. The first reel 1 may be constituted of molded plastic, for instance, and is supported at the shaft in such a manner that it can rotate. The first tape 4 is wound around the external circumferential surface of the first reel. An anti-adherence treatment is performed on the surface that is on the opposite side from the surface where the first chemical material layer 41 is provided in the first tape 4 and, consequently, even when the first chemical material layer 41 has an adhesive property, the first tape 4 can be drawn out without any problem. The supporting body 40 of the first tape 4 is constituted of a transparent plastic film. It goes without saying that the type of plastic film constituting the supporting body 40 of the first tape 4 is selected from materials with chemical resistance against the first chemical material layer 41.

The second reel 2 holds a second tape 5. The second tape 5 is provided with a second chemical material layer 51 on one surface of a supporting body 50 with characteristics whereby it generates a chemical reaction upon being placed in contact with the first chemical material layer 41, thereby producing an indication that can be visually checked. The second tape 5 is also provided with an adhesive layer 52 and a separating layer 53 which are sequentially laminated on the other surface of the supporting body 50. The second reel 2 too, may be constituted of molded plastic and is supported at the shaft in such a manner that it can rotate. The second tape 5 is wound around the external circumferential surface of the second reel 2. The type of plastic film constituting the supporting body 50 of the second tape 5 is selected from materials that have chemical resistance against the second chemical material layer 51. The separating layer 53 is constituted of so-called separating paper on both surfaces of which an anti-adhesive treatment has been performed. As a result, the separating layer 53 can be easily peeled off from the adhesive layer 52. Reference numbers 71 to 74 indicate guide rollers.

The rollers 31 and 32 press and bond the first tape 4, drawn out from the first reel 1 in the direction indicated with the arrow a1 onto the second tape 5, drawn out from the second reel 2 in the direction indicated with the arrow a2 in such a manner that the first chemical material layer 41 and the second chemical material layer 51 come in contact with each other, thereby forming a tape laminate 6. In addition, they separate the separating layer 53 from the second tape 5.

The tape laminate 6 is drawn out in the direction indicated with the arrow a3. As a means for drawing out the first tape 4 from the first reel 1 and for drawing out the second tape 5 from the second reel 2, a method in which the tape laminate 6 is physically pulled in the direction indicated with the arrow a3 may be employed, or a method in which the rollers 31 and 32 are mechanically or physically rotated in the directions indicated with the arrows b1 and b2 respectively may be employed.

As described above, the first reel 1 holds the first tape 4 and the second reel 2 holds the second tape 5. Consequently, when not in use, the first tape 4 provided with the first chemical material layer 41 on one surface and the second tape 5 provided with the second chemical material layer 51 on one surface that generates a chemical reaction upon being placed in contact with the first chemical material layer 41 of the first tape 4, can be held without causing the chemical reaction in a standby state for use.

The rollers 31 and 32 press and bond the first tape 4 drawn out from the first reel 1 onto the second tape 5 drawn out from the second reel 2 in such a manner that the first chemical material layer 41 and the second chemical material layer 51 come in contact with each other, thereby forming the tape laminate 6. As a result, when in use, the tape laminate 6, which is achieved by laminating the first tape 4 and the second tape 5 with the two chemical material layers 41 and 51 placed in contact with each other can be fed out.

In the second tape 5, the adhesive layer 52 and the separating layer 53 are laminated sequentially on opposite surfaces and the rollers 31 and 32 separate the separating layer 53 from the second tape 5 to form the tape laminate 6. Thus, by utilizing the adhesive force of the adhesive layer 52 provided at the second tape 5, the tape laminate 6, which can be immediately adhered to a product, is fed out.

The supporting body 40 of the first tape 4 has transparency and the second chemical material layer 51 provided at the second tape 5 has characteristics such that when it is placed in contact with the first chemical material layer 41, a chemical reaction is generated and an indication is produced through the chemical reaction that can be visually checked. As a result, the indication resulting from the chemical reaction between the two chemical material layers 41 and 51 can be visually checked from the outside through the first tape 4 while the tape is adhered to a product. It is to be noted that by constituting the supporting body 50 and the adhesive layer 52 with transparent materials, the indication resulting from the chemical reaction between the two chemical material layers 41 and 51 can be visually checked from the front of the second tape 5.

In the embodiment, two rollers 31 and 32 are provided to constitute the means for tape joining 3 and with the pressure applied between the rollers 31 and 32, the first tape 4 and the second tape 5 passing between the rollers 31 and 32 are pressed and bonded together. This ensures that the first chemical material layer 41 provided at the first tape 4 and the second chemical material layer 51 provided at the second tape 5 are placed in complete contact, to reliably achieve the desired chemical reaction.

The tape feeding apparatus in the figures includes a blade 33, which constitutes a means for separating as part of the means for tape joining 3. The blade 33 has an arc-shaped surface 331. The arc-shaped surface 331 faces opposite the roller external circumferential surface 321 over a distance g at the tape output side of the roller 32, with which the second tape 5 comes in contact. The distance g, which is constant over an arc shape, is set at a value that is slightly larger than the thickness of the separating layer 53. In addition, it is desirable to set the length over which distance g holds constant in the circumferential direction at 45° or more when measured by the central angle of the roller 32. Since the separating layer 53, which is pressed downward between the rollers 31 and 32 is peeled off by the front tip of the blade 33, the separating layer 53 can be reliably separated.

Moreover, in the embodiment, a means for cutting 8 is provided. The means for cutting 8 cuts the tape laminate 6 which is fed out in the direction indicated with the arrow a3 from the rollers 31 and 32, which constitute the means for tape joining, at specific dimensions. The means for cutting 8 in the figure is provided with a cutter 81 and a receptacle 82. When the cutter 81 is driven in the direction indicated with the arrow C1, the tape laminate 6 is cut. The cutter 81 then retreats in the direction indicated with the arrow C2 to prepare for the tape laminate 6 to be drawn out. Alternatively, a means for cutting 8 may be constituted with a manual means, i.e., physically cutting with scissors or the like.

One of the specific examples of application of the tape feeding apparatus according to the present invention is handling of tape that indicates a temperature/time integrated value starting from the point in time at which two different chemical material layers come in contact with each other. This tape is explained next. The tape is achieved by taking advantage of the fact that when a radical generating agent and a pigment or pigment precursor which undergoes a change in color when reacting to the generated radical are combined, the change in color takes place in correspondence to the concentration of the radical and the fact that the radical concentration is determined by the temperature and time in conformance to the Arrhenius equation, and indicates a temperature/time integrated value that represents the accumulated passage of time at a specific temperatures or the total accumulated quantity of heat as a change in color. Consequently, the tape is achieved by using two types of tapes, i.e., a tape that holds a radical generating agent and a tape that holds a pigment and/or a pigment precursor that undergoes a change in color when reacting to the generated radical.

When the present invention is adopted in this technology, the combination of the first chemical material layer 41 provided at the first tape 4 and the second chemical material layer 51 provided at the second tape 5 is achieved by a combination of a radical generating agent and a pigment and/or a pigment precursor that undergoes a change in color when reacting to the generated radical. Alternatively, the combination may be achieved by providing the second chemical material layer 51 at the first tape 4 and providing the first chemical material layer 41 at the second tape 5.

The quantity of radicals generated by different radical generating agents at a specific temperature is defined in correspondence to their decomposition temperatures. Thus, by selecting an optimal radical generating agent for the desired temperature and length of time and by combining it with a pigment and/or a pigment precursor that colors upon being placed in contact with that particular radical generating agent, the time over which the color is made to change can be determined. In other words, since the speed at which the radical generating agent decomposes is determined in conformance to the Arrhenius equation, the quantity of generated radicals is determined in a function of the temperature and time. Consequently, it becomes possible to indicate the temperature/time integrated value as a change in color.

The substances that may be used for the radical generating agent include organic peroxides, azo compounds and halogenated carbon compounds. Specific examples of organic peroxides that may be used are dialkyl peroxides, diacyl peroxides, ketone peroxides, peroxyketals, hydroperoxides, peroxyesters and the like. Among these, benzoyl peroxide, in particular, is ideal to be used for the radical generating agent because of its outstanding balance between the radical generating capability and stability in storage.

Specific examples of azo compounds include azo nitrites, azo amidines, azo amides, azo allyl and the like.

Specific examples of halogenated carbon compounds include polyhalogen compounds such as carbon tetrabromide.

The radical generating agent should be added at a ratio of 1.0 to 20.0 wt % against the holding medium and more preferably, should be added at a ratio of 2.0 to 15.0 wt %.

The pigment and/or pigment precursor that undergoes a change in color when reacting to the radical, has a property whereby the hydrogen element in the molecule can be easily dislodged by the radical, and a temperature/time integrated value is indicated by taking advantage of the change in color that takes place when the hydrogen element is removed from the molecule. Examples of the pigment and/or pigment precursor that undergoes a change in color when reacting to the radical include phenothiazine coloring pigments, phenoxasine pigments, triphenyl methane compounds, quinoline dyes, fluorine dyes, indolylphthalide dyes, spiropyrane dyes, azaphthalide dyes, diphenylmethane dyes, chromenopyrazole dyes, luecoauramine dyes, azomethylene dyes, rhodamine lactam dyes, triazine dye and the like. The color may be further adjusted by adding other pigments or dyes to any of these pigments and/or pigment precursors.

The pigment and/or pigment precursor should be added at a ratio of 1.0 to 20 wt % against the holding medium and, more preferably, should be added to satisfy a ratio of 2.0 to 15.0 wt %.

The material for constituting the holding media for holding the radical generating agent and the pigment and/or pigment precursor that undergoes a change in color when reacting to the radical, may be selected from a wide range of materials as long as it satisfies the requirements that the radical generating agent and the pigment and/or pigment precursor can be dispersed while retaining its shape at a specific temperature and that it has a sufficient degree of transparency to enable verification of the change in color. Specifically, any of the resins that are normally used as binders for ink, paint and the like such as acrylic resins, polyester resins, polyether resins, polyurethane resins, silicone resins, epoxy resins, vinyl resins and the like, and any of the adhesive rubber resins which are normally used as adhesive may be used. The material may be diluted with solvent. In particular, an adhesive rubber resin is desirable since it will achieve an adhesive function.

Specific examples of the supporting body 40 and the supporting body 50 for the first tape 4 and the second tape 5 respectively, which support the radical generating agent and the pigment and/or pigment precursor, described above, are explained below.

The supporting body 40 of the first tape 4 may be constituted of, for instance, an olefin film such as polyethylene or polypropylene, a polyester film such as polyethylene terephthalate or a plastic film such as cellophane, polyvinylidene chloride, polyvinylidene chloride copolymer, polyvinylidene fluoride, polyvinyl chloride, nylon, polyacrylic acid and polymethacrylate. Other materials, as long as they have a sufficient degree of transparency to enable verification of the changing color, may be used without any restrictions. The anti-adherence treatment on the supporting body 40 may be achieved by applying a silicon or fluoride separating agent.

The supporting body 50 of the second tape 5 may be constituted of a material similar to that constituting the supporting body 40. The separating layer 53 of the second tape 5 may be constituted by applying a polyethylene onto paper such as wood-free paper, kraft paper or the like and then by applying a silicon anti-adherence agent. The anti-adherence treatment on the supporting body 40 may be achieved by applying a silicone or fluoride separating agent.

In addition, the pigment and/or pigment precursor may contain a decomposition catalyst for the radical generating agent. With this, even when only one type of radical generating agent is used, the length of time over which the color undergoes a change at a specific temperature can be set.

The adhesive layer 52 provided at the second tape 5 may be constituted of an adhesive rubber resin.

Figure 3:
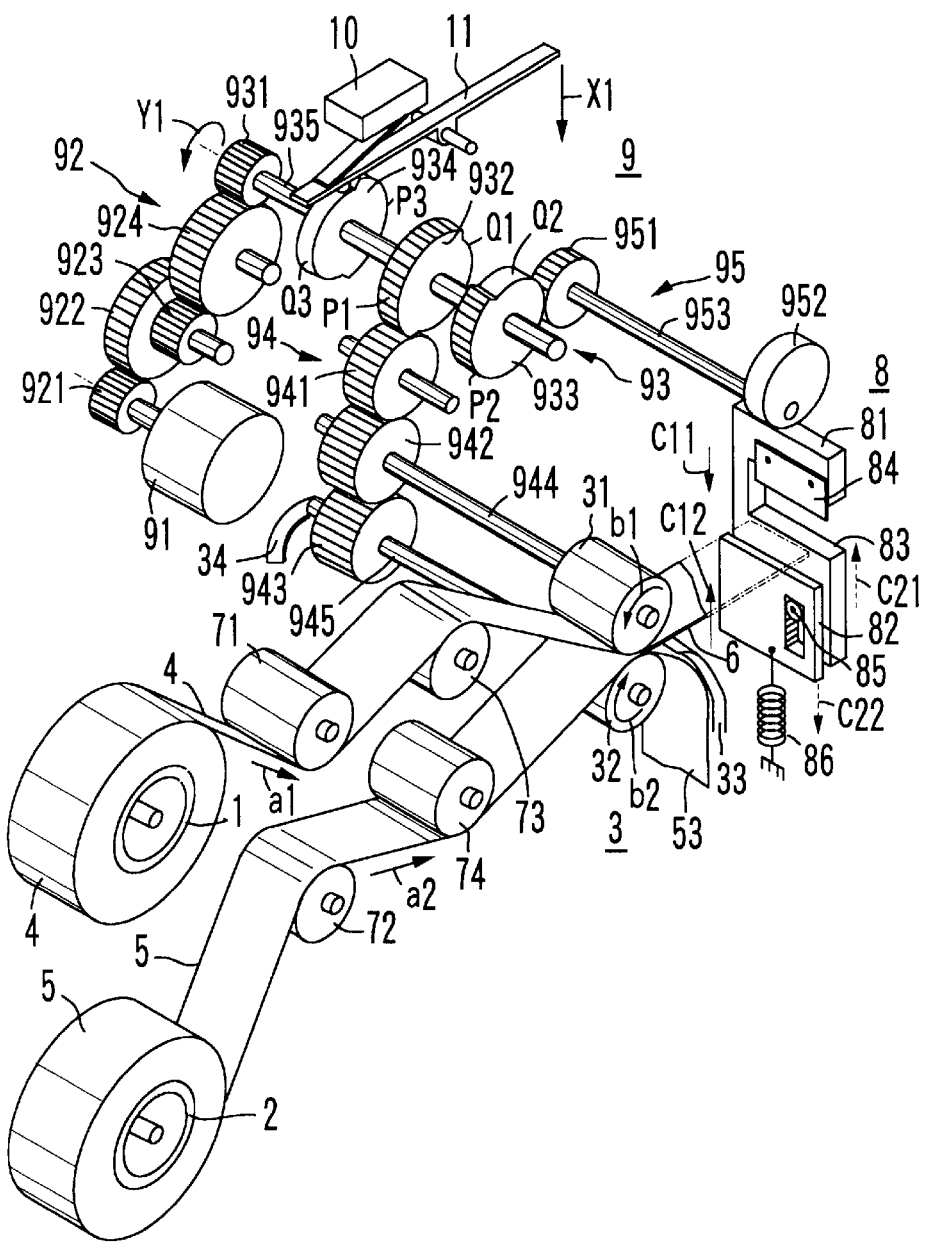
FIG. 3 is a perspective showing a more specific embodiment of the tape feeding apparatus according to the present invention.

FIG. 3 is a perspective showing a more specific embodiment of the tape feeding apparatus according to the present invention. In the figure, the same reference numbers are assigned to components that are identical to those shown in FIGS. 1 and 2. The tape feeding apparatus in this embodiment is provided with a means for drive 9. Although not illustrated, the means for drive 9 is assembled inside a case constituted of plastic or the like and is supported, together with the first reel 1 holding the first tape 4, the second reel 2 holding the second tape 5, the rollers 31 and 32, the guide rollers 71 to 74, the cutter 81 and the receptacle 82.

The means for drive 9 drives and rotates the rollers 31 and 32 and it also drives the cutter 81 and the receptacle 82. The rollers 31 and 32 are driven and rotated in the directions indicated with the arrows b1 and b2 by the driving force supplied by the means for drive 9. With this, the first tape 4, fed out from the first reel 1, which constitutes the first means for tape holding, and the second tape 5, fed out from the second reel 2, which constitutes the second means for tape holding, are delivered. Of the rollers 31 and 32, it is desirable to provide the roller 32, for instance, in such a manner that it can open/close relative to the roller 31 so that the gap between the rollers 31 and 32 can be increased/decreased. By doing so, the first tape 4 and the second tape 5 can be guided through the gap formed between the roller 31 and the roller 32. Reference number 34 indicates a guide groove that is employed to accommodate the roller 32 for opening/closing.

In addition, the cutter 81 and the receptacle 82 are driven in the directions in which they approach each other as indicated with the arrows C11 and C12 or are driven in the directions in which they move away from each other as indicated with the arrows C21 and C22, by the driving force provided by the means for drive 9.

Figure 7:
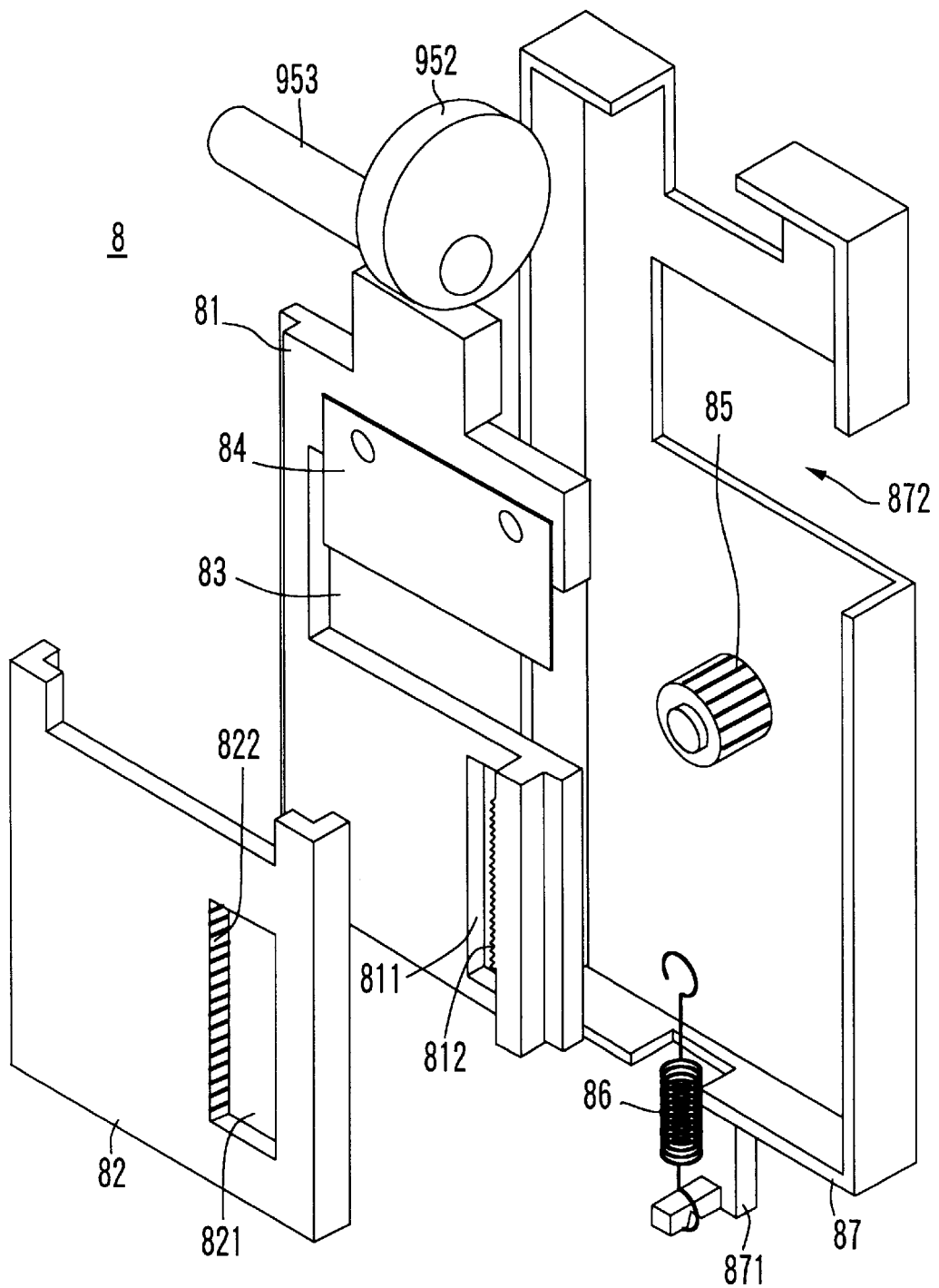
FIG. 7 is an exploded diagram showing details of the cutter and the receptacle device used in the tape feeding apparatus according to the present invention shown in FIG. 3.

FIG. 7 is an exploded view showing details of the cutter 81 and the receptacle 82. In the figure, the cutter 81 and the receptacle 82 are provided facing opposite each other so that they can slide against each other. On the surfaces of the cutter 81 and the receptacle 82 that face opposite each other, holes 811 and 821 respectively, are provided. A rack gear 812 is provided on a wall surface that is continuous with an internal surface of the hole 811. A rack gear 822 is provided at an internal wall surface of the hole 821 at a position facing opposite the rack gear 812. On the outside of the cutter 81, a supporting body 87 is provided to support a pinion gear 85. The supporting body 87 is provided with a projection 871 and one end of a spring 86 is retained at this projection 871. The other end of the spring 86 is retained at the receptacle 82. The supporting body 87 is mounted in a case (not shown).

The means for drive 9 includes a motor 91, a first means for transmission, a means for timing setting 93, a second means for transmission 94 and a third means for transmission 95. The first means for transmission 92 is constituted with a group of gears 921 to 924 that communicate the rotating driving force of the motor 91. Since the primary function of the first means for transmission 92 is to communicate the driving force of the motor 91 with its speed reduced, the quantity and positions of the gears 921 to 924 are not limited to those in the embodiment.

The means for timing setting 93, which is linked to the first means for transmission 92, sets the timing with which the rollers 31 and 32 are driven and the timing with which the cutter 81 and the receptacle 82 are operated. The means for timing setting 93 is provided with a gear 931 that interlocks with the gear 924, which constitutes part of the first means for transmission 92, and through this interlocking of the gear 924 and the gear 931, the means for timing setting 93 is linked with the first means for transmission 92. The means for timing setting 93 is also provided with an intermittent gear 932 to constitute a means for setting the timing with which the rollers 31 and 32 are driven. The intermittent gear 932 is provided with a toothed portion P1 and a toothless portion Q1 with no teeth and a smaller radius. The means for timing setting 93 is further provided with an intermittent gear 933 to constitute a means for setting the timing with which the cutter 81 and the receptacle 82 are operated. As in the case of the intermittent gear 932, the intermittent gear 933 is also provided with a toothed portion P2 and a toothless portion Q2 with no teeth and a smaller radius.

Furthermore, the means for timing setting 93 is provided with a cam 934 for setting the timing with which the motor 91 is operated. The cam 934 has a large radius section P3 and a small radius portion Q3. An actuator 11, which is linked with a switch 10, is in contact with the external circumferential surface of the cam 934. The switch 10 turns on/off the motor 91. The gear 931, the intermittent gear 932, the intermittent gear 933 and the cam 934 are linked in an integrated manner on a shaft 935.

The second means for transmission 94 is provided between the intermittent gear 932 and the rollers 31 and 32 to drive the rollers 31 and 32 with the timing set by the intermittent gear 932. The second means for transmission 94 in the figure is constituted by interlocking a planetary gear 941, a gear 942 and a gear 943 sequentially. While the planetary gear 941 rotates due to the rotating force communicated from the intermittent gear 932 when it becomes interlocked with the toothed portion P1 of the intermittent gear 932, it slides over the toothless portion Q1 and does not rotate. The gear 942 is mounted securely to a rotating shaft 944 to which the roller 31 is secured, whereas the gear 943 is mounted securely at a rotating shaft 945 to which the roller 32 is secured.

The third means for transmission 95 is provided between the intermittent gear 933 and the cutter 81 and receptacle 82 to drive the cutter 81 and the receptacle 82 with the timing set by the intermittent gear 933. More specifically, it is provided with a gear 951 which interlocks with the intermittent gear 933 and a decentered cam 952 and it is constituted by linking the gear 951 and the decentered cam 952 in an integrated manner at a rotating shaft 953. The external circumferential surface of the decentered cam 952 is in contact with the end surface of the cutter 81 to drive the cutter 81. As explained earlier, since the pinion gear 85, which is supported rotatably at the supporting body 87, interlocks with the rack gear 812 provided on the wall surface continuous with the internal surface of the hole 811 provided at the cutter 81 and the rack gear 822 provided at the wall 821 of the receptacle 82, when the cutter 81 is pressed downward by the decentered cam 952, the pinion gear 85 is caused to rotate by the rack gear 812, and the receptacle 82, which is provided with the rack gear 822 interlocking with the pinion gear 85, becomes elevated, moving in a direction the reverse of the direction of the movement of the cutter 81. When the rotating radius of the decentered cam 952 becomes reduced, the receptacle 82 becomes subject to the force of the spring 86 and is lowered. This causes the cutter 81 to react by moving upward.

The intermittent gear 932 and the intermittent gear 933 maintain a relationship whereby the period of time for driving the rollers 31 and 32 set by the intermittent gear 932 is followed by a period of time set by the intermittent gear 933, over which the cutter 81 and the receptacle 82 are operated to cut the tape laminate 6. This relationship is achieved through selecting specific positional relationships between the positions of the toothed portion P1 and the toothless portion Q1 of the intermittent gear 932 and the corresponding positions of the toothed portion P2 and the toothless portion Q2 of the intermittent gear 933 in a specific manner. In addition, the lengths of the circumference of the large radius portion P3 and the small radius portion Q3 of the cam 934 are determined to ensure that the tape feed performed by the rollers 31 and 32 and the cutting operation performed by the cutter 81 and the receptacle 82 are completed by the time the cam 934 rotates one cycle.

Next, the operation is explained in reference to FIGS. 3 to 6. When the actuator 11 is driven in the direction indicated with the arrow X1 with a physical force from the state shown in FIG. 3, the switch 10 is turned on and the motor 91 starts rotating. The rotating driving force of the motor 91 is communicated to the gear 931 via the gears 921 to 924, which rotates the shaft 935, which is formed as an integrated part of the gear 931, in the direction indicated with the arrow Y1. With the rotation of the shaft 935, the cam 934, the intermittent gear 932 and the intermittent gear 933 are caused to rotate. When the cam 934 rotates, the actuator 11 is caused to ride on the large radius portion P3 of the cam 934, thereby maintaining the on state of the switch 10. As a result, after this, even if the driving force in the direction indicated with the arrow X1 for the actuator 11 is removed (even if the actuator is released), the motor 91 continues to rotate and the rotating shaft 935, and the cam 934, the intermittent gear 932 and the intermittent gear 933, which are mounted on the rotating shaft 935, all continue to rotate.

With the rotation of the intermittent gear 932, its toothed portion P1 becomes interlocked with the planetary gear 941. Then the gear 942 and the gear 943 are caused to rotate via the planetary gear 941 and the roller 31, which is linked with the gear 942 via the shaft 944, is rotated in the direction indicated with the arrow b1 and, at the same time, the roller 32, which is linked with the gear 943 via the shaft 945 is caused to rotate in the direction indicated with the arrow b2. With this, as shown in FIG. 4, the first tape 4 drawn from the reel 1 and the second tape 5 drawn from the reel 2 become subjected to the pressing and bonding effect imparted by the roller 31 and the roller 32 and are then fed out as the tape laminate 6 in the direction indicated with the arrow a3.

While the roller 31 and the roller 32 are engaged in the feed out operation, the gear 951 slides over the toothless portion Q2 of the intermittent gear 933. Thus, since the gear 951 does not rotate, the cutting operation is not performed.

Figure 4:
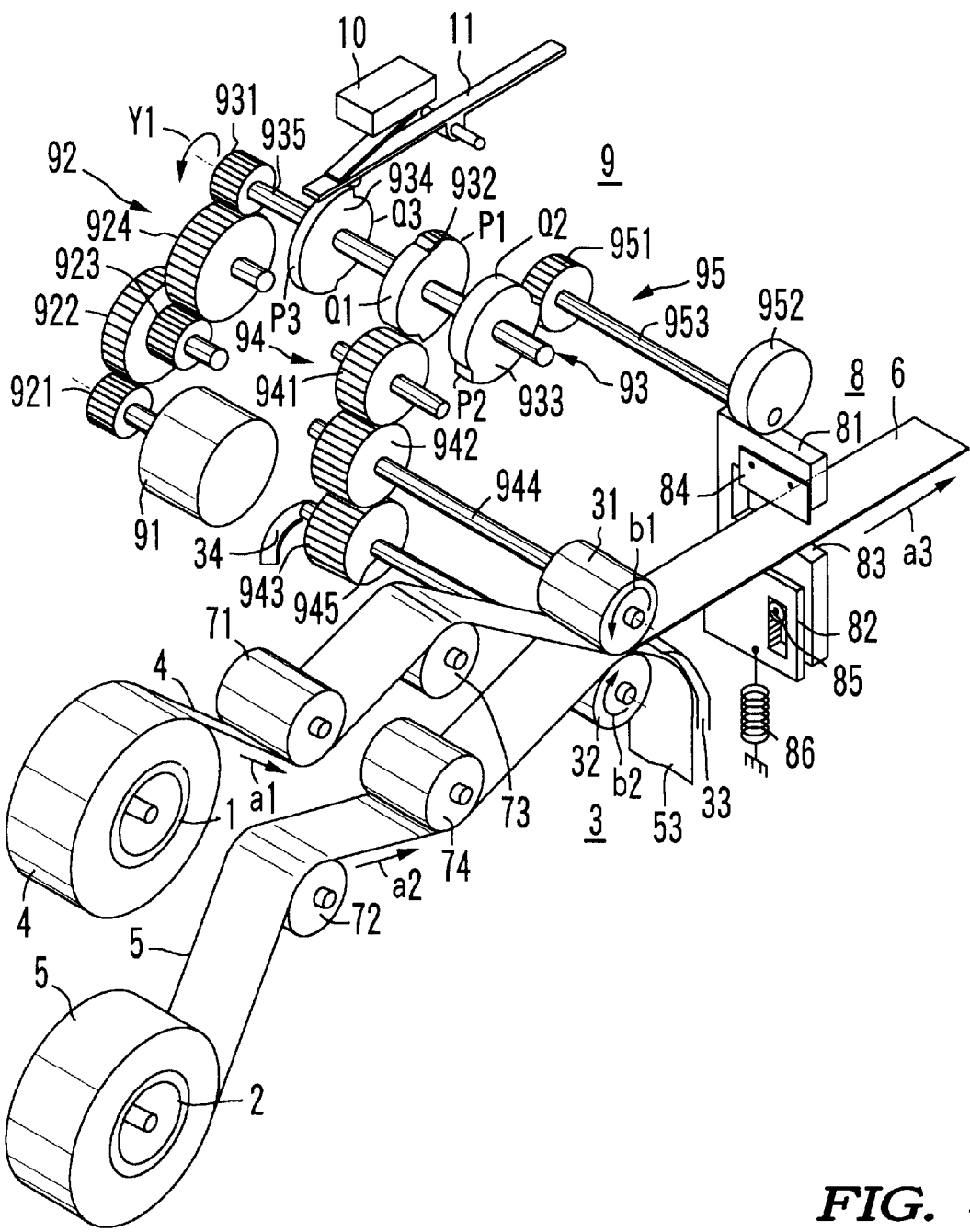
FIG. 4 illustrates the operation of the tape feeding apparatus according to the present invention shown in FIG. 3.

With the rotation of the rotating shaft 935, the intermittent gear 932 keeps rotating further and, after it rotates to the position at which the toothless portion Q1 of the intermittent gear 932 comes in contact with the planetary gear 941, as shown in FIG. 4, the planetary gear 941 slides over the circumferential surface of the toothless portion Q1. This causes the rotation of the planetary gear 941 to stop, which, in turn, causes the rotation of the gears 942 and 943 to stop. As a result, the rotation of the rollers 31 and 32 stops, halting the feed out operation of the tape laminate 6. At this point, a required length of the tape laminate 6 has already been obtained.

Figure 5:
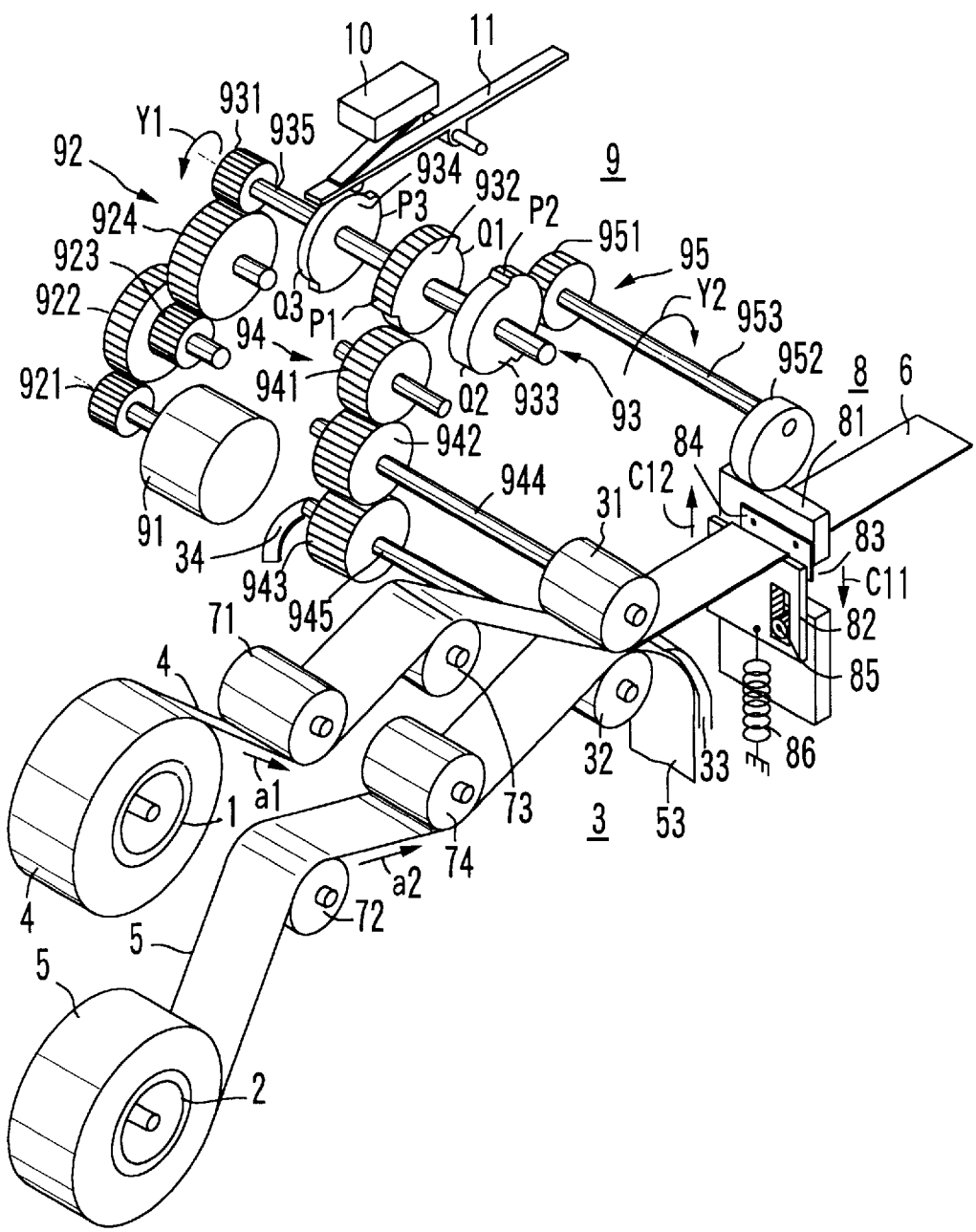
FIG. 5 illustrates the operation of the tape feeding apparatus according to the present invention which is performed after the operation shown in FIG. 4.

Now, by the time the planetary gear 941 stops rotating, the intermittent gear 933 has rotated to the position at which its toothed portion P2 interlocks with the gear 951. As the rotating shaft 935 further rotates, the gear 951 is driven and rotated by the intermittent gear 933, causing the decentered cam 952 to rotate in the direction indicated with the arrow Y2. Then, as shown in FIG. 5, as the axial radius of the decentered cam 952 increases on the side where it is in contact with the cutter 81, the cutter 81 is pressed down in the direction indicated with the arrow C11 and, at the same time, the receptacle 82 is pressed upward in the direction indicated with the arrow C12. With this, the tape laminate 6 is cut off.

Figure 6:
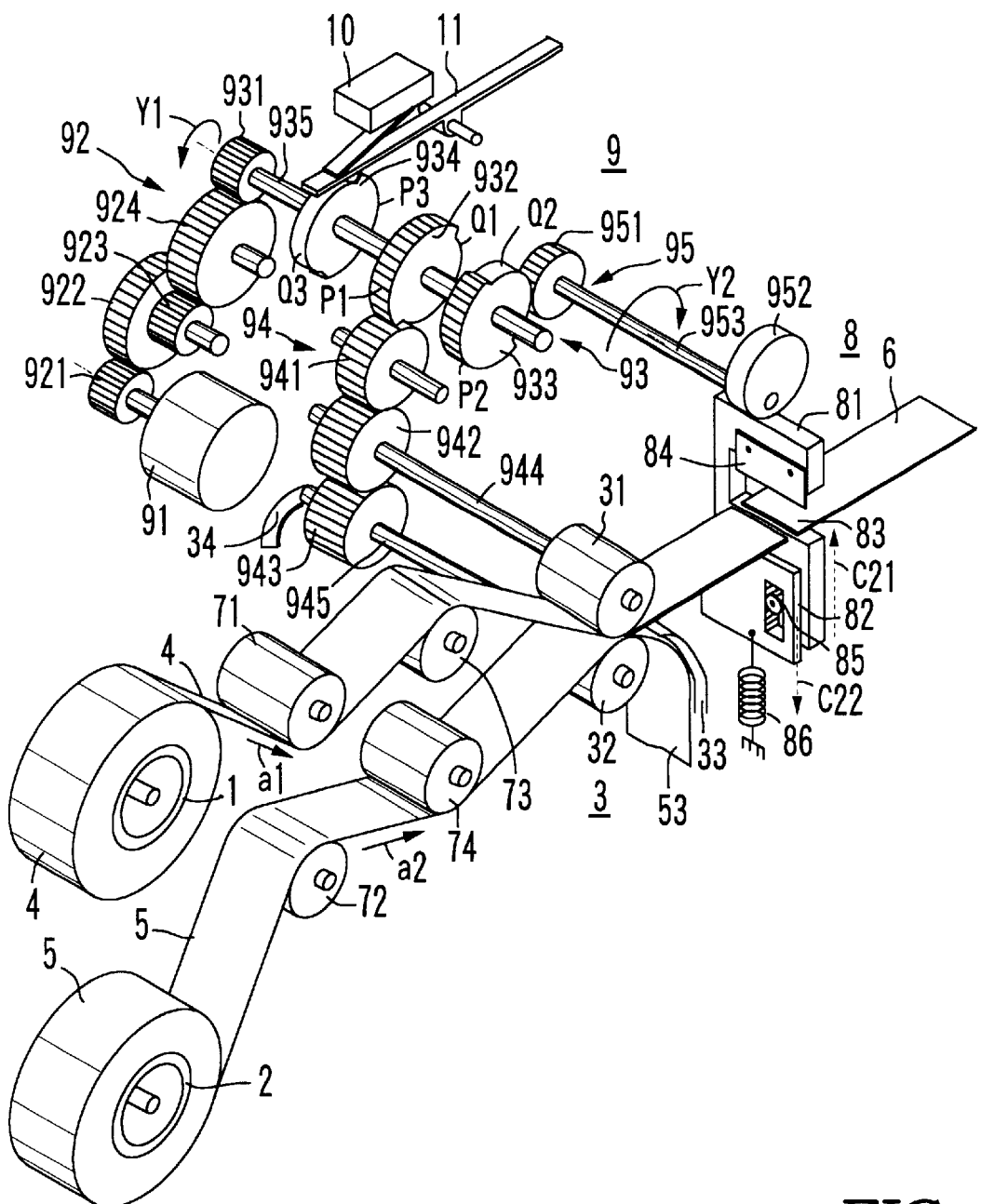
FIG. 6 illustrates the operation of the tape feeding apparatus according to the present invention which is performed after the operation shown in FIG. 5.

The decentered cam 952 keeps rotating further, and as the rotating radius of the decentered cam 952 becomes reduced at the side where it is in contact with the cutter 81, the cutter 81 becomes elevated in the direction indicated with the arrow C21 and the receptacle 82 becomes lowered in the direction indicated with the arrow C22, as shown in FIG. 6.

At this point, the actuator 11 is already on the small radius portion P3 of the cam 934, thereby setting the switch 10 in an off state to stop the rotation of the motor 91. The timing with which the actuator 11 moves from the large radius portion P3 to the small radius portion Q3 of the cam 934 to turn off the switch 10 is determined by taking into consideration the characteristics of the motor 91. If the motor 91 stops rotating immediately when the switch 10 is turned off, the length of the large radius portion P3 in the circumferential direction must be increased to ensure that the rotation of the motor 91 is maintained to the position at which the cutter 81 is completely elevated. If, on the other hand, the motor 91 keeps rotating due to inertia for a period after the switch 10 has been turned off, it is necessary to elevate the cutter 81 to a specific position by taking advantage of the inertia-induced rotation of the motor 91 and reducing the length of the large radius portion P3 in the circumferential direction.

Figure 8:
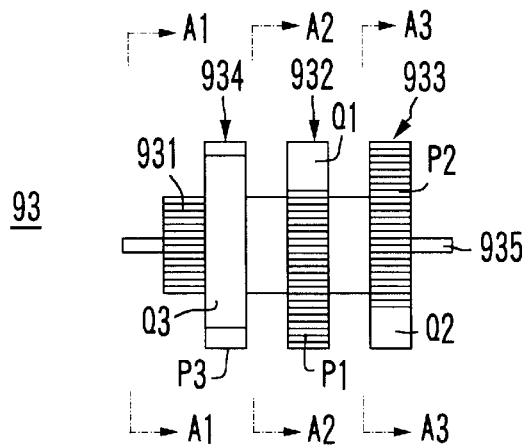
FIG. 8 is a frontal view of the means for timing setting employed in the tape feeding apparatus according to the present invention shown in FIG. 3.

Next, in reference to FIGS. 8 to 12, a specific example of the means for timing setting 93 is explained in detail. FIG. 8 is a frontal view of the means for timing setting 93 and FIGS. 9 to 12 show relative rotational positions of the cam 934, the intermittent gear 932 and the intermittent gear 933. In FIGS. 9 to 12, reference number A1 indicates the rotational position of the cam 934 viewed in cross section through line A1—A1 in FIG. 8, reference number A2 indicates the rotational position of the intermittent gear 932 viewed in cross section through line A2—A2 in FIG. 8 and reference number A3 indicates the rotational position of the intermittent gear 933 viewed in cross section through line A3—A3 in FIG. 8. The gear 931, the cam 934, the intermittent gear 932 and the intermittent gear 933, to which the rotating force from the motor 91 (see FIGS. 3 to 6) is applied, are linked as an integrated part by means of the common rotating shaft 935. At the cam 934, the large radius portion P3 and the small radius portion Q3 are provided over approximately half the circumference each. As explained earlier, the ratio of the large radius portion P3 and the small radius portion Q3 provided at the cam 934 is determined in correspondence to the quantity of the inertia-induced rotation of the motor 91.

The toothed portion P1 of the intermittent gear 932 has a circumferential length that is slightly smaller than half the circumference and the circumferential length of the toothless portion Q1 is set to be slightly larger than half the circumference. The relationship between the toothed portion P1 of the intermittent gear 932 and the planetary gear 941 must ensure that the toothed portion P1 starts to interlock with the planetary gear 941 when the actuator 1 rides on the large radius portion P3 of the cam 934.

The toothed portion P2 of the intermittent gear 933 has a circumferential length that is slightly larger than half the circumference and the circumferential length of the toothless portion Q2 is set to be slightly smaller than half the circumference. The relationship between the toothed portion P2 of the intermittent gear 933 and the toothed portion P1 of the intermittent gear 932 must ensure that when the toothed portion P1 starts to interlock with the planetary gear 941, the toothed portion P2 of the intermittent gear 933 moves away from the gear 951.

Figure 9:
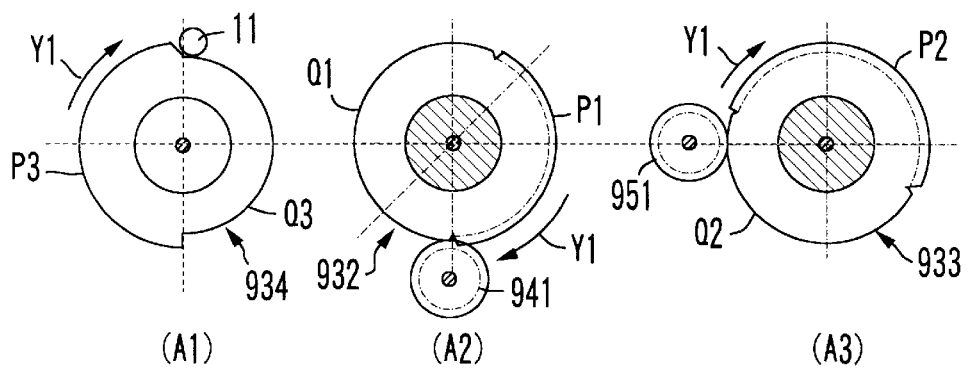
FIG. 9 shows rotational positions of the cam and the intermittent gears included in the means for timing setting shown in FIG. 8.

FIG. 9 shows a state that is achieved immediately before the actuator 11 rides over the large radius portion P3 of the cam 934, immediately before the planetary gear 941 starts to interlock with the toothed portion P1 of the intermittent gear 932 and immediately after the toothed portion P2 of the intermittent gear 933 becomes disengaged from the gear 951. It is assumed that this state corresponds to a state after the completion of the operation.

In FIG. 9, when, by operating the actuator 11, the motor 91 starts to rotate and the rotating shaft 935 rotates in the direction indicated with the arrow Y1, the actuator 11 rides over the large radius portion P3 of the cam 934 to maintain an on state of the switch 10 with the motor 91 continuing to rotate (see FIGS. 3 to 6). With this, the rotating shaft 935 and the cam 934, the intermittent gear 932 and the intermittent gear 933, which are all mounted on the rotating shaft 935, continue to rotate.

Figure 10:
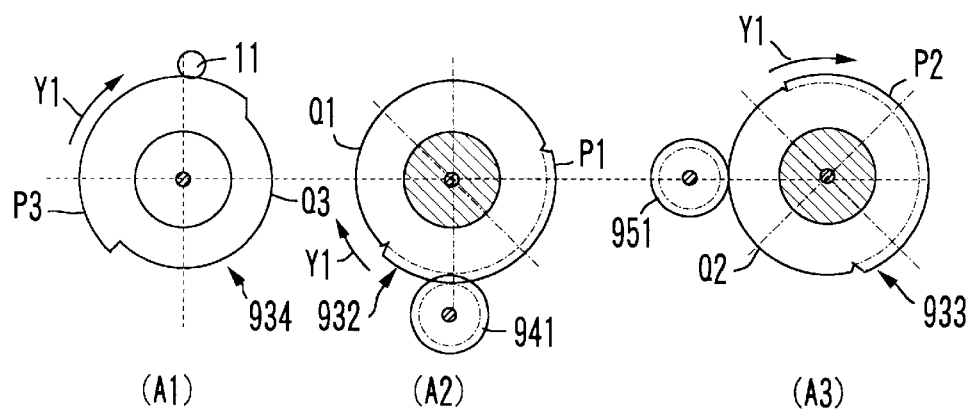
FIG. 10 shows rotational positions of the cam and the intermittent gears included in the means for timing setting shown in FIG. 8, following those shown in FIG. 9.

FIG. 10 shows a state that is achieved through a 45° rotation from the position shown in FIG. 9, in which with the rotation of the intermittent gear 932, its toothed portion P1 becomes interlocked with the planetary gear 941. While the toothed portion P1 is interlocked with the planetary gear 941, the gear 951 slides over the toothless portion Q2 of the intermittent gear 933. Consequently, the gear 951 does not rotate.

Figure 11:
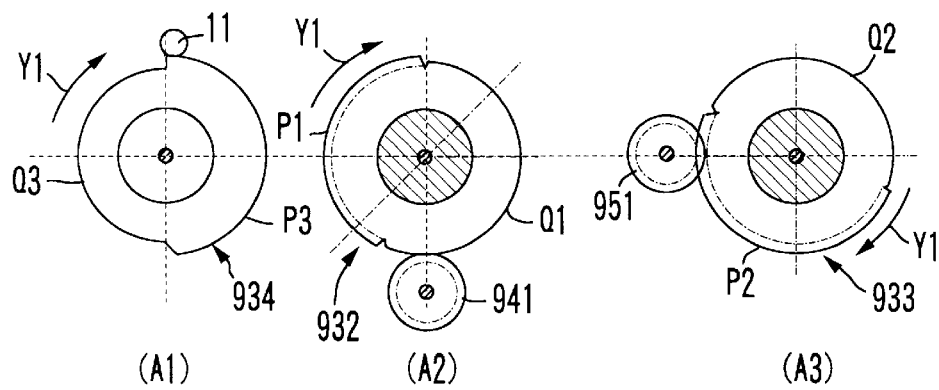
FIG. 11 shows rotational positions of the cam and the intermittent gears included in the means for timing setting shown in FIG. 8, following those shown in FIG. 10.

The rotation of the rotating shaft 935 causes the intermittent gear 932 to rotate further and, as shown in FIG. 11, after it rotates to a position at which the toothless portion Q1 of the intermittent gear 932 comes in contact with the planetary gear 941, the planetary gear 941 slides over the circumferential surface of the toothless portion Q1. Thus, the rotation of the planetary gear 941 stops. During the process illustrated in FIGS. 9 to 11, the tape feed operation explained in reference to FIGS. 3 and 4 is performed.

Figure 12:
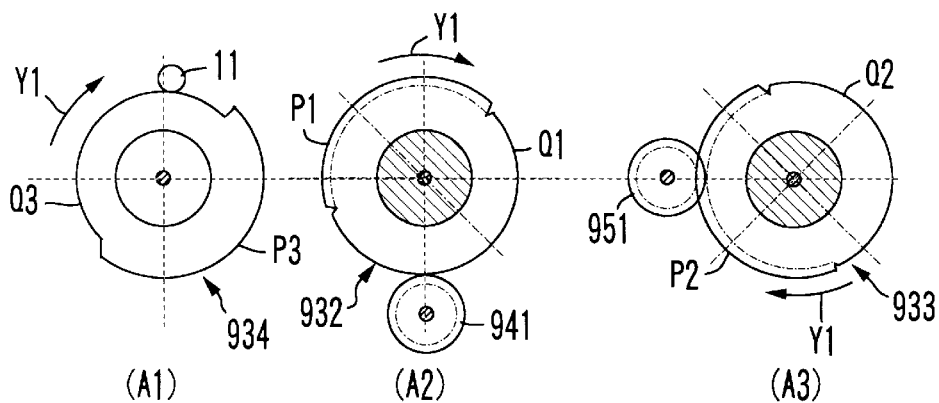
FIG. 12 shows rotational positions of the cam and the intermittent gears included in the means for timing setting shown in FIG. 8, following those shown in FIG. 11.

Now, as shown in FIG. 11, by the time the rotation of the planetary gear 941 stops, the intermittent gear 933 will have rotated to the position at which its toothed portion P2 becomes interlocked with the gear 951. After this, the gear 951 is driven and rotated by the intermittent gear 933. FIG. 12 shows a state in which the rotation has progressed beyond the position shown in FIG. 11. The cutting explained in reference to FIG. 5 is executed with approximately the timing with which the state shifts from that illustrated in FIG. 11 to that illustrated in FIG. 12.

In FIG. 12, the actuator 11 is already in contact with the small radius portion Q3 of the cam 934 and the switch 10

(see FIGS. 3 to 6) is in an off state. However, due to the inertia-induced rotation of the motor 91, the rotating shaft 935 continues to rotate. Because of this, the intermittent gear 933, too, continues to rotate. During this inertia-induced rotation, the gear 951, which is interlocked with the intermittent gear 933, continues to rotate. Then, finally, the operation shifts to the initial state (normal stopped state) shown in FIG. 8. During the process in which the state shifts from that illustrated in FIG. 12 to that illustrated in FIG. 8, the elevating operation of the cutter 81 and the lowering operation of the receptacle 82 shown in FIG. 6 are executed.

Figure 13:
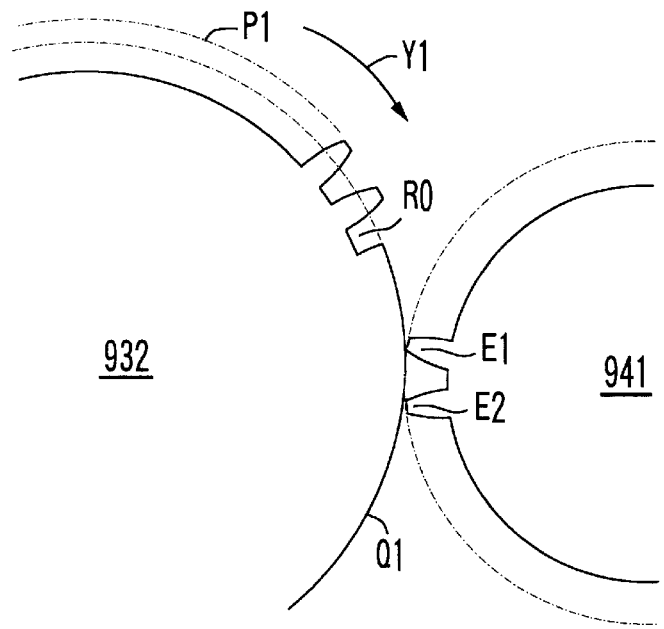
FIG. 13 illustrates the sliding effect achieved between the toothless portion of the intermittent gear and the gear.

FIG. 13 illustrates the sliding phase between the toothless portion Q1 of the intermittent gear 932 and the planetary gear 941. As shown in the figure, the tops of the two adjacent teeth E1 and E2 of the planetary gear 941 are in contact with the circumferential surface of the toothless portion Q1. Because of this, the planetary gear 941 slides over the circumferential surface of the toothless portion Q1 in the state in which its rotation is prohibited. The intermittent gear 933 and the gear 951 also have a similar relationship.

Figure 14:
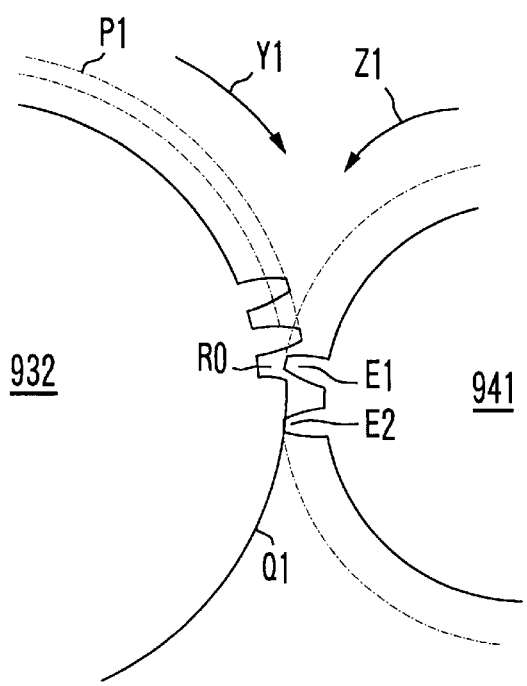
FIG. 14 illustrates the interlocking between the toothed portion of the intermittent gear and the gear.

FIG. 14 illustrates the interlocking phase between the toothed portion P1 of the intermittent gear 932 and the planetary gear 941. The toothed portion P1 is constituted with an indented portion R0 at the boundary with the toothless portion Q1. Thus, the tooth E1 of the planetary gear 941 that has slid over the toothless portion Q1 enters the indented portion R0 and then interlocks with the toothed portion P1. As a result, its movement from the toothless portion Q1 to the toothed portion P1 is made smoothly and the planetary gear 941 rotates in the direction indicated with the arrow Z1. A similar relationship is achieved between the intermittent gear 933 and the gear 951.

Figure 15:
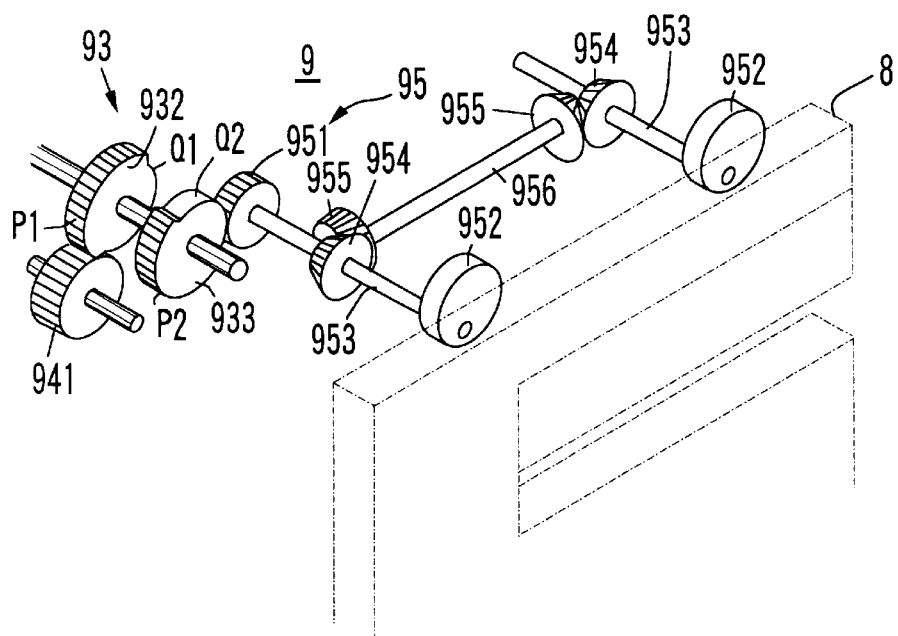
FIG. 15 shows another embodiment of the third means for transmission included in the tape feeding apparatus shown in FIG. 3.
Figure 16:
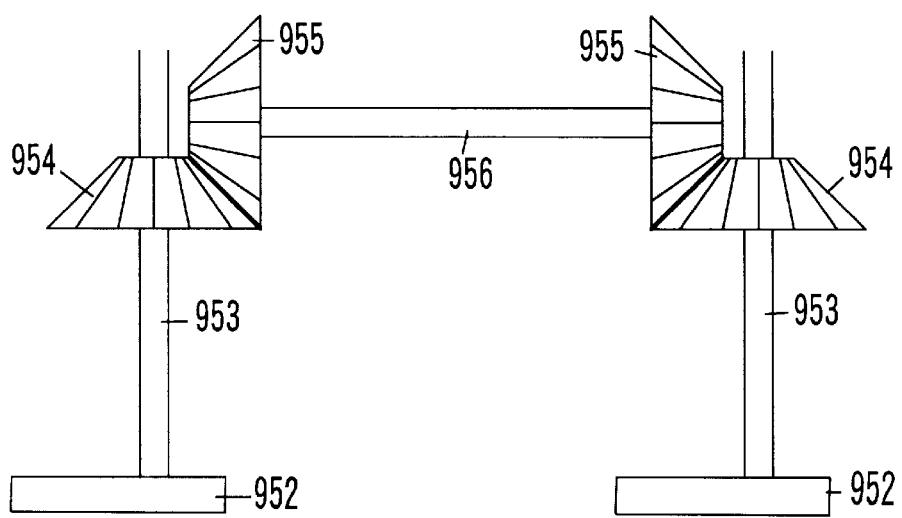
FIG. 16 is a plan view of the third means for transmission shown in FIG. 15.

FIG. 15 shows another embodiment of the third means for transmission included in the tape feeding apparatus shown in FIG. 3, and FIG. 16 is a plan view of the third means for transmission shown in FIG. 15. In the figures, the same reference numbers are assigned to components that are identical to those shown in FIG. 3 and their detailed explanation is omitted. In this embodiment, the third means for transmission 95 is constituted by positioning two decentered cams 952 and 952 over a distance from each other, securely mounting bevel gears 954 and 954 onto rotating shafts 953 and 953 of the decentered cams 952 and 952 and interlocking bevel gears 955 and 955, which are fixed at the two ends of a rotating shaft 956, with the bevel gears 954 and 954. One of the rotating shafts 953 and 953 is provided with a gear 951 at one end, and when the gear 951 rotates, one of the decentered cams 952 is driven and rotated and also one of the bevel gears 954 is driven and rotated. Then, one of the bevel gears 955, which is interlocked with the bevel gear 954, is driven and rotated and this rotating motion is communicated via the rotating shaft 956 to drive and rotate the other bevel gear 955 and the bevel gear 954, which is interlocked with the other bevel gear 955, thereby driving and rotating the other decentered cam 952 mounted at the other rotating shaft 953.

The plurality of decentered cams 952 and 952 are positioned as appropriate to ensure that they drive the means for cutting 8 in synchronization. Consequently, in the embodiment shown in FIGS. 15 and 16, the rather long means for cutting 8 can be pressed evenly.

Figure 17:
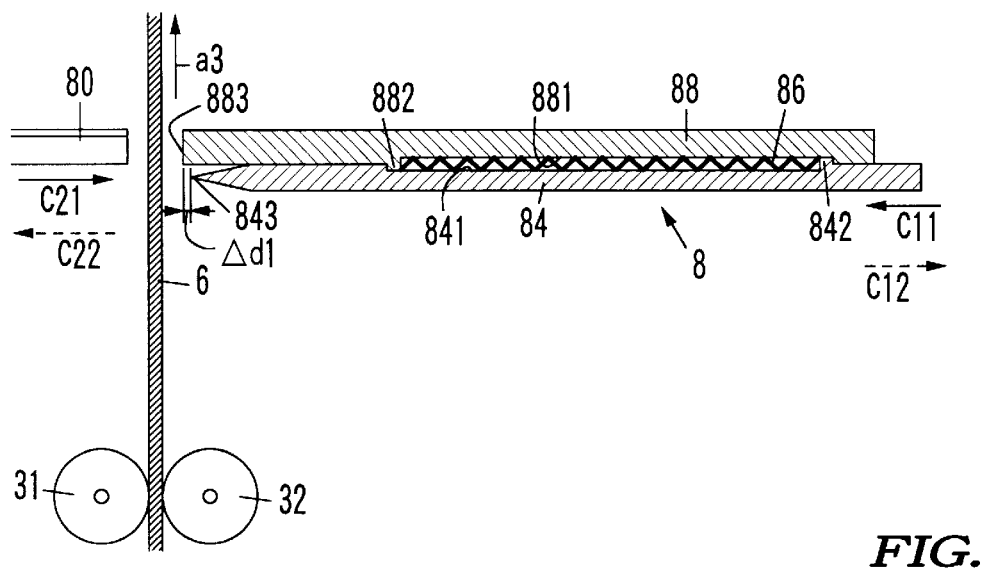
FIG. 17 shows another embodiment of the means for cutting employed in the tape feeding apparatus according to the present invention.

FIG. 17 shows another embodiment of the means for cutting 8 employed in the tape feeding apparatus according to the present invention. The means for cutting 8 in this embodiment can replace the means for cutting shown in FIG. 3. The means for cutting 8 includes a cutter 84, a supporting member 88 and a coil spring 86. The means for cutting 8 is driven in the direction indicated with the arrow C11 during the cutting operation of the tape laminate 6 and when the cutting operation ends, it retreats in the direction indicated with the arrow C12. Reference number 80 indicates a receptacle member and reference number 6 indicates the tape. The cutter 84 and the supporting member 88 are positioned facing opposite each other so that they can slide against each other. Holes 841 and 881 are provided at the surfaces of the cutter 81 and the supporting member 88 respectively that face opposite each other. A projection 842 is provided toward the rear end of the hole 841 and a projection 882 is provided toward the front end of the hole 881. The projection 842 is provided inside the hole 881 and the production 882 is positioned inside the hole 841. The supporting member 88 is positioned closer to the output side of the tape laminating body 6 than the cutter 84 and its front end 893 projects out further than the front end 843 of the cutter 84 by a distance d1.

The coil spring 86 is compressed between the projection 842 and the projection 882 within the space constituted with the hole 841 and the hole 881. The cutter 84, which is subject to the compressed spring pressure imparted by the coil spring 86, is positioned with the projection 842 coming in contact with the rear wall surface of the hole 881 provided at the supporting member 88. The cutter 84 and the supporting member 88 constitute an integrated assembly in which the cutter 84 can slide over the supporting member 88 with the coil spring 86 within.

The receptacle member 80, which is positioned to face opposite the supporting member 88 of the means for cutting 8, is driven in the direction indicated with the arrow C21 during the cutting operation of the tape laminate 6 and retreats in the direction indicated with the arrow C22 when the cutting operation ends.

Figure 18:
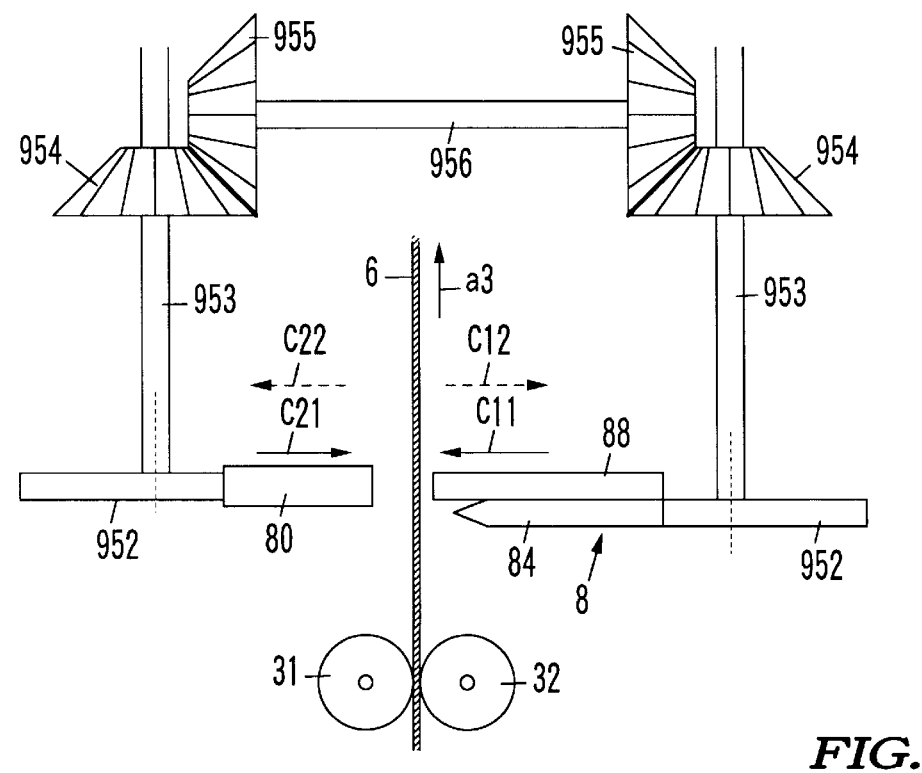
FIG. 18 shows the drive mechanism for the means for cutting shown in FIG. 17.

FIG. 18 shows a drive mechanism for driving the means for cutting 8 and the receptacle member 80. In the figure, the drive mechanism is essentially identical to the third means for transmission shown in FIG. 16. The only difference is that the decentered cams 952 and 952 are mounted at the rotating shafts 953 and 953 so that they will have symmetry relative to the tape laminate 6. One of the decentered cams 952 drives the means for cutting 8 in the direction indicated with either the arrow C11 or C12, whereas the other decentered cam 952 drives the receptacle member 80 in the direction indicated with either the arrow C21 or C22. Since the main objective of FIG. 18 is to illustrate the mechanism clearly and simply, the positional relationships that the decentered cams 952 and 952 have relative to the receptacle member 80 and the means for cutting 8 do not necessarily correspond to the actual positioning.

Figure 19:
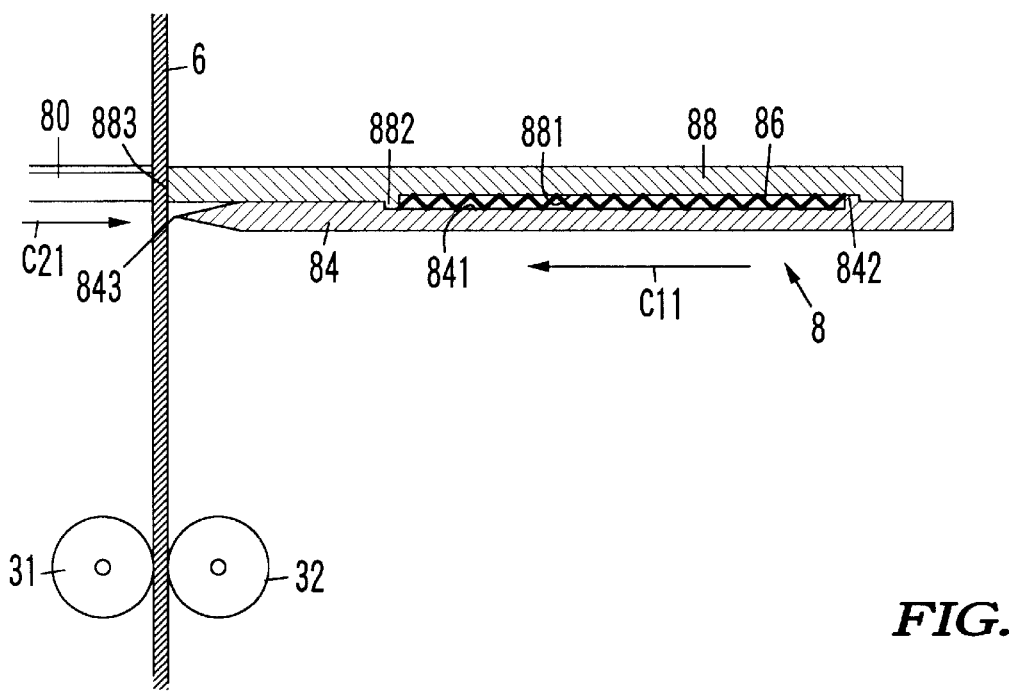
FIG. 19 illustrates the operation of the means for cutting shown in FIG. 17.
Figure 20:
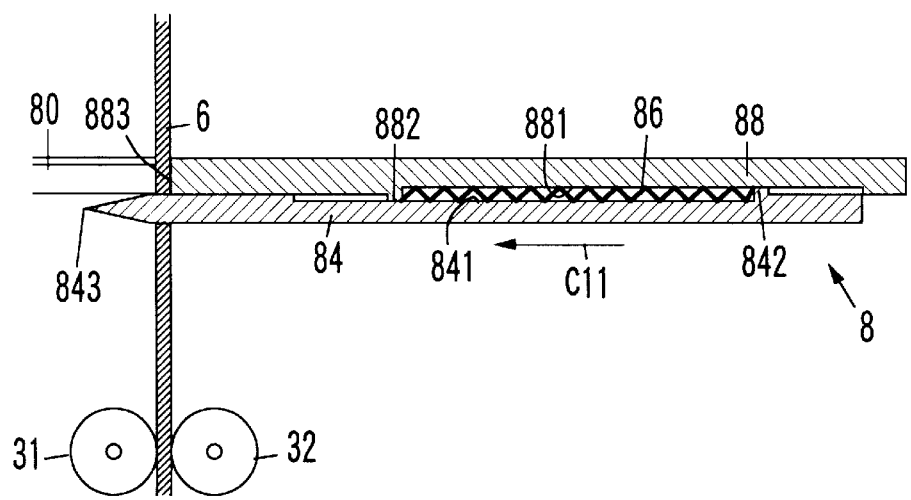
FIG. 20 illustrates the operation performed following the operation shown in FIG. 19.

FIGS. 19 and 20 illustrate the operation performed by the means for cutting shown in FIGS. 17 and 18. A pressing force imparted by one of the decentered cams 952 in the direction indicated with the arrow C11 is applied to the rear end portion of the cutter 84 and the entire assembly comprising the cutter 84, the supporting member 88 and the coil spring 86 moves in the direction indicated with the arrow C11, and a pressing force imparted by the other decentered cam 952 in the direction indicated with the arrow C21 is applied to the rear end portion of the receptacle member 80 to cause the receptacle member 80 to move in the direction indicated with the arrow C21 (see FIG. 19). With this, the tape laminate 6 is clamped between the receptacle member 80 and the supporting member 88. When the cutter 84 further moves in the direction indicated with the arrow C11, since the front end 883 of the supporting member 88 projects out further than the front end 843 of the cutter 84 by d1, the front end 883 of the supporting member 88 comes in contact with the tape laminate 6 on the receptacle member 80 before the cutter 84 does (see FIG. 19).

With the front end 883 coming in contact with the tape laminate 6 on the receptacle member 80, the supporting member 88 cannot advance any further, whereas the cutter 84 advances further while compressing the coil spring 86 to cut the tape laminate 6 (see FIG. 20). At this time, the tape laminate 6 is held between the receptacle member 80 and the front end 883 of the supporting member 88 due to the compressed spring pressure of the coil spring 86. As a result, the tape laminate 6 can be cut to a specific dimension in a reliable manner without allowing any misalignment.

Figure 21:
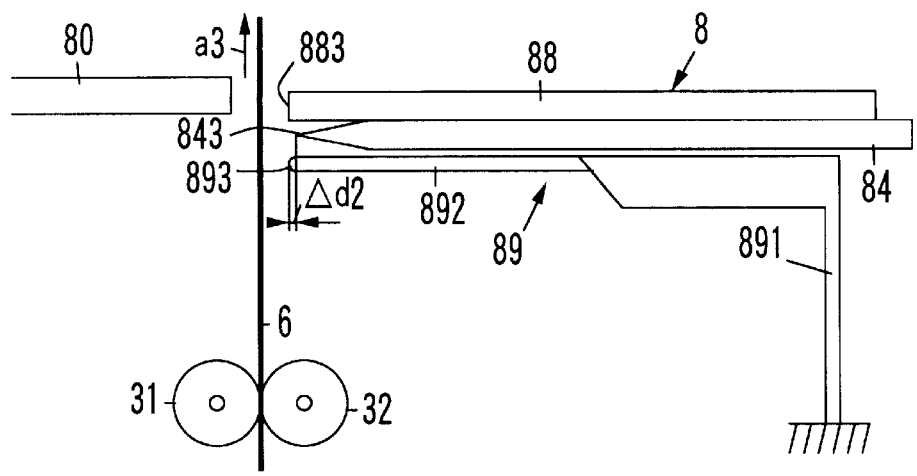
FIG. 21 shows another embodiment of the means for cutting employed in the tape feeding apparatus according to the present invention.

FIG. 21 shows another embodiment of the means for cutting that may be employed in the tape feeding apparatus according to the present invention. The means for cutting 8 in this embodiment, too, may replace the means for cutting shown in FIG. 3. The means for cutting 8 includes the cutter 84 and a means for separating 89.

The means for separating 89 is positioned closer to the output side of the tape laminate 6 than the cutter 84. The means for separating 89 is provided with a supporting arm 891, one end of which is fixed and a spring arm portion 892 which is continuous with the other end of the supporting arm 891. The spring arm portion 892 extends in a direction that runs almost parallel to the cutter 84, and its front end 893 projects out further than the front end 843 of the cutter 84 by a distance d2. The front end of the spring arm portion 892 of the means for separating 89 or its vicinity is constituted of a material that has a non-stick or separating property relative to the adhesive contained in the tape laminate 6.

Figure 22:
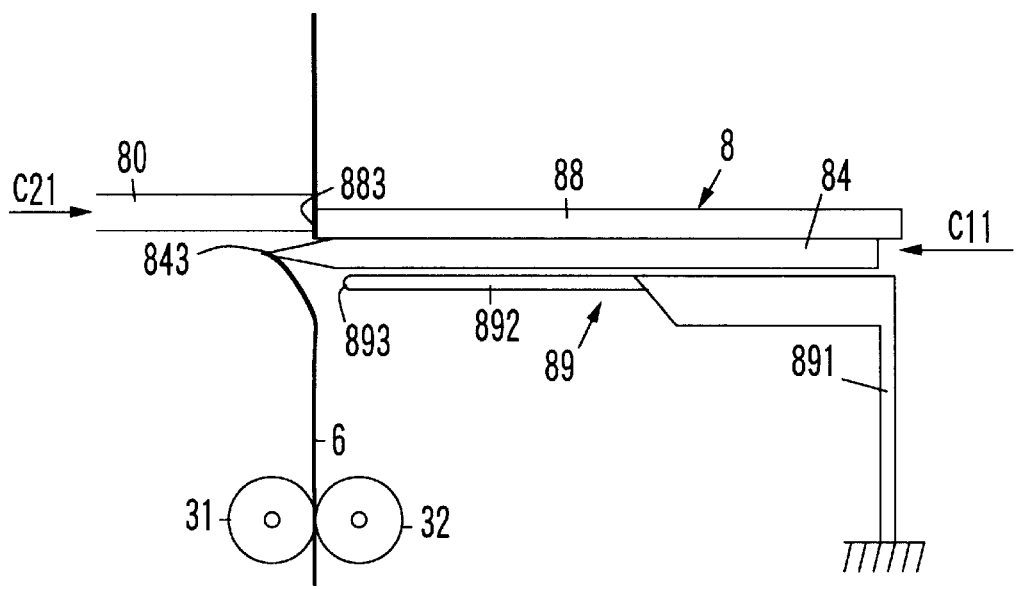
FIG. 22 illustrates the operation of the means for cutting shown in FIG. 21.
Figure 23:
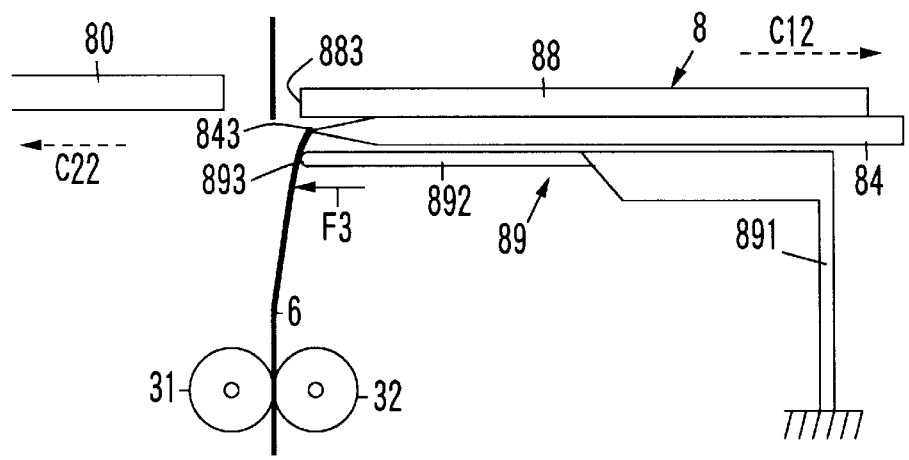
FIG. 23 illustrates the operation of the means for cutting shown in FIG. 21.

FIGS. 22 and 23 illustrate the operation of the means for cutting shown in FIG. 21. When a pressing force, which is imparted by the decentered cam (see FIGS. 3 to 7, and FIGS. 15 and 16) in the direction indicated with the arrow C11 is applied to the rear end portion of the cutter 84, the cutter 84 moves in the direction indicated with the arrow C11 to cut the tape laminate 6 (see FIG. 22).

After the cutting, as shown in FIG. 23, the receptacle member 80 retreats in the direction indicated with the arrow C22 and the cutter 84 retreats in the direction indicated with the arrow C12. At this time, the adhesive contained in the tape laminate 6 causes the tape laminate 6 to adhere to the front end (blade edge) of the cutter 84 and, because of this, the tape laminate 6 begins to move in the direction indicated with the arrow C12 along with the retreating cutter 84. However, since the front end 893 of the spring arm portion 892 projects out further than the front end 843 of the cutter 84 by the distance d2, the tape laminate 6, which would otherwise move along with the cutter by adhering to the blade edge 843 of the cutter 84 is pressed in the direction indicated with the arrow F3 by the front end 893 to be separated from the blade edge 843.

If a spring property is given to the whole of the means for separating 89, the separation of the tape laminate 6 can be executed by the spring action of the means for separating 89 and it becomes possible to separate the tape laminate 6 from the cutter 84 in a reliable manner.

Figure 24:
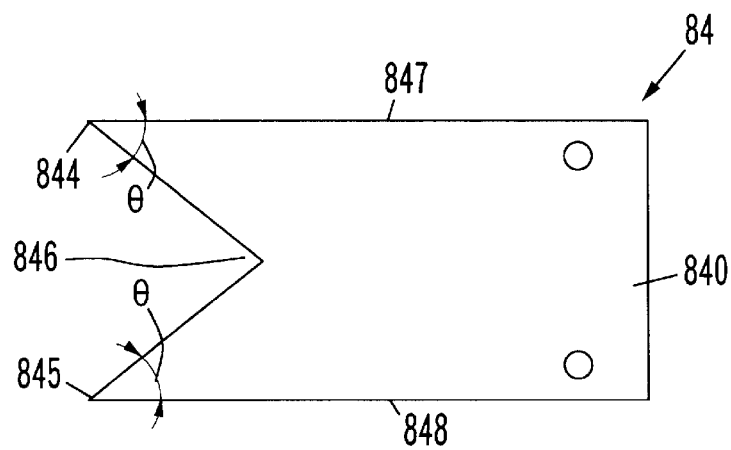
FIG. 24 is a plan view illustrating an example of the cutter included in the means for cutting.

FIG. 24 is a plan view of an example of the cutter that is included in the means for cutting. This cutter is effective when the holding members for the first tape and the second tape constituting the tape laminate 6 are constituted of film with relatively high strength such as polyester film. The cutter 84 shown in the figure has a blade edge of a specific unique shape. The blade edge is provided with peak portions 844 and 845 at the two ends of a base body 840 in the direction of its width and between the peak portion 844 and the peak portion 845, a V-shaped valley portion 846 is provided. The inclining surfaces of the valley portion 846 are made to incline at an angle θ relative to the sides 847 and 848 of the base body 840 in the direction of its width. The angle θ should be set within a range of 40° to 30° depending upon such factors as the stroke that the cutter 84 may take, the width of the tape, the materials constituting the tape and the like, and more desirably, the angle θ should be selected at approximately 25°.

When the cutter, which is shaped as shown in FIG. 24, is employed, the tape laminate 6 can be cut very sharply even if the first tape and the second tape constituting the tape laminate 6 are constituted of film with a relatively high strength such as polyester film.

Figure 25:
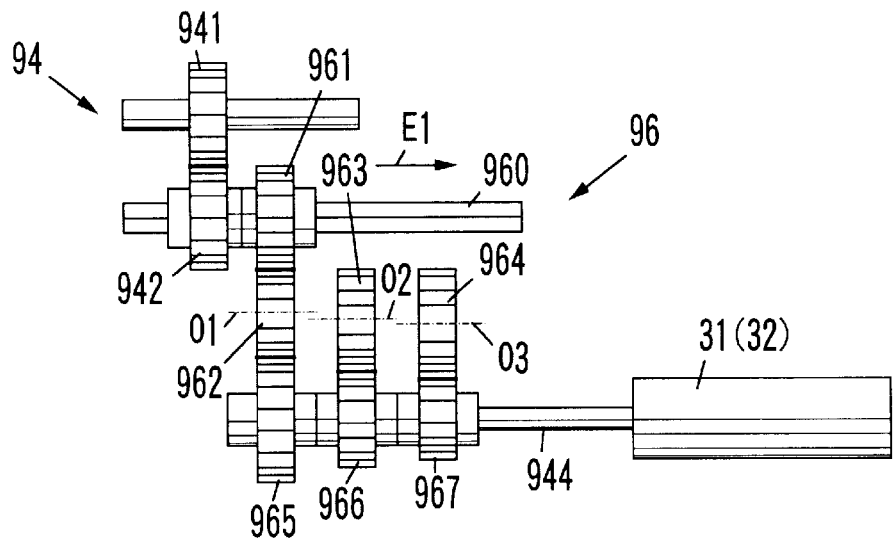
FIG. 25 shows another embodiment of the second means for feeding out which may be employed in the tape feeding apparatus according to the present invention.

FIG. 25 shows another embodiment of the second means for transmission 94 that may be adopted in the tape feeding apparatus according to the present invention shown in FIG. 3. The second means for transmission 94 is provided between the intermittent gear 932 and the rollers 31 and 32 so that it drives the rollers 31 and 32 with the operating timing set by the intermittent gear 932, as has already been explained in reference to FIG. 3. In the embodiment shown in FIG. 25, the second means for transmission 94 includes a feed quantity adjusting mechanism 96, which performs variable adjustment of the quantity of feed performed by the rollers 31 and 32. The feed quantity adjusting mechanism 98 in the figure is constituted by interlocking the gear 941 which interlocks with the intermittent gear 932 (see FIG. 3) with the gear 942, which is secured on an angular shaft 960. The gear 942 is axially secured on the angular shaft 960 through a square hole and rotates together with the angular shaft 960. Another gear 961 is secured onto the angular shaft 960. The gear 942 is secured on the angular shaft 960 through the square hole and rotates together with the angular shaft 960 and also is capable of sliding on the angular shaft 960 in the direction of the shaft axis E1. The movement of the gear 961 in the shaft axial direction E1 can be executed from the outside by a means for movement (not shown).

Three planetary gears 962 to 964 are provided at positions where they can become interlocked with the gear 961. The planetary gear 962 interlocks with a gear 965, which is axially secured on the rotating shaft 944 of the roller 31 (or 32). The planetary gear 963 interlocks with the gear 966 which is axially secured on the rotating shaft 944. The planetary gear 964 interlocks with the gear 967 which is axially secured on the rotating shaft 944. The diameters of the gears 965, 966 and 967 are different and the number of teeth also varies in correspondence to the diameter of each gear. The planetary gears 962, 963 and 964 are made to interlock with the gears 965, 966 and 967 with varying diameters and varying numbers of teeth, and the diameters and the numbers of teeth of the planetary gears 962, 963 and 964 are varied and their rotating centers O1 to O3 are also varied to ensure that the gear 961, which slides over the angular shaft 960 in the axial direction E1, can be made to interlock with each of the planetary gears 962, 963 and 964.

In the illustration in FIG. 25, the gear 961 is interlocked with gear 965 via the planetary gear 962 and the roller 31 (or 32) rotates at a rotation rate that is determined by the gear ratio of the gear 961 and the gear 965. Thus, the quantity of the tape laminate 6 (see FIG. 3) fed out corresponds to this rotation rate.

When the gear 961 is made to slide on the angular shaft 960 in the axial direction E1 to become interlocked with the planetary gear 963 or the planetary gear 964, the roller 31 (or 32) rotates at a rotation rate that is determined by the gear ratio of the gear 961 and the selected gear 963 or 964, and the quantity of the tape laminate 6 (see FIG. 3) fed out corresponds to this rotation rate.

Figure 26:
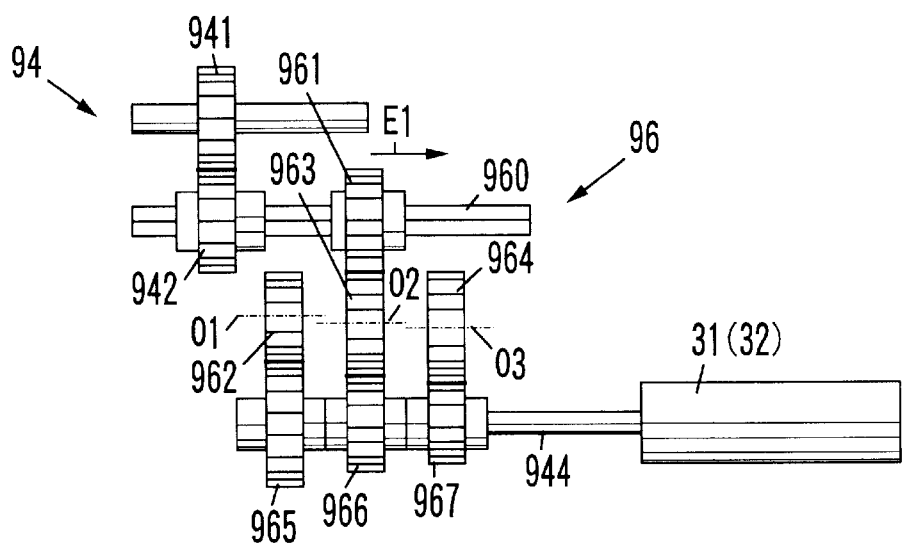
FIG. 26 illustrates the operation of the embodiment shown in FIG. 25.

FIG. 26 shows the gear 961 interlocking with the planetary gear 963. In this embodiment, since the number of teeth in the gear 966 is smaller than that in the gear 956, the rotation rate of the roller 31 (or 32) is greater than that in the case illustrated in FIG. 24, resulting in a larger feed quantity of the tape laminate 6 (see FIG. 3).

While the present invention has been explained in reference to a limited number of embodiments, it will be obvious to those skilled in the art that a number of variations may be achieved based upon the basic concept and teachings of the present invention.

As has been explained, the following advantages are achieved according to the present invention.

(a) A tape feeding apparatus that, in the non operating state, is capable of holding a first tape provided with a chemical material layer on one surface and a second tape provided with a chemical material layer that undergoes a chemical reaction upon being placed in contact with the chemical material layer of the first tape, without causing the chemical reaction, can be provided.

(b) A tape feeding apparatus that, in the operating state, is capable of feeding out a tape laminate obtained by laminating the first tape and the second tape with the two chemical substances placed in contact with each other, can be provided.

(c) A tape feeding apparatus that is capable of feeding out a tape laminate that indicates a temperature/time integrated value starting from the point in time at which the two chemical material layers provided at the first tape and the second tape come in contact with each other, can be provided.

(d) A tape feeding apparatus that is capable of feeding out a tape laminate with which the indication thereupon, resulting from the chemical reaction between the two chemical material layers, can be visually checked from the outside through the first tape while the tape laminate is adhered to a product, can be provided.

We claim:

1. A tape feeding apparatus comprising:

a first means for tape holding for holding a first tape that is provided with a first chemical material layer on one surface of a transparent supporting body thereof;

a second means for tape holding for holding a second tape that is provided with a second chemical material layer on one surface of a supporting body thereof, with said second chemical material layer having characteristics such that a chemical reaction is generated when said second chemical material layer is placed in contact with said first chemical material layer, wherein on another surface of said supporting body of said second tape, an adhesive layer and a separating layer are sequentially laminated;

a means for tape joining that presses and bonds said first tape drawn out from said first means for tape holding and said second tape drawn out from said second means for tape holding in such a manner that said first chemical material layer and said second chemical material layer come in contact with each other thereby forming a tape laminate, wherein said chemical reaction between said first chemical material layer and said second chemical material layer results in an indication being produced that can be visually checked, wherein said means for tape joining peels off said separating layer from said second tape;

a means for cutting that cuts said tape laminate fed out from said means for tape joining to a specific length, wherein said means for cutting includes a cutter and a means for separating said tape laminate from said cutter; and a means for drive that intermittently drives said means for tape joining and said means for cutting.

2. A tape feeding apparatus according to claim 1, wherein:

said tape laminate indicates a temperature/time integrated value starting from a point in time at which said first chemical material layer and said second chemical material layer come in contact with each other.

3. A tape feeding apparatus according to claim 1, wherein:

said means for tape joining includes a combination of at least two rollers and presses and bonds said first tape onto said second tape passing between said rollers with a pressure applied between said rollers.

4. A tape feeding apparatus according to claim 3, wherein:

said means for tape joining is provided with a means for separating said separating layer from said second tape of said tape laminate, and wherein said means for separating said separating layer from said second tape of said tape laminate includes a blade with said blade having an arc surface, and on a tape feed-out side of said roller that comes in contact with said second tape, said arc surface faces opposite an external circumferential surface of said roller over a distance.

5. A tape feeding apparatus according to claim 1, wherein:

said means for tape joining has a tape feed function with which said first tape, drawn out from said first means for tape holding, and said second tape, drawn out from said second means for tape holding, are fed out.

6. A tape feeding apparatus according to claim 1, wherein:

said means for drive comprises a motor, a first means for transmission, a means for timing setting, a second means for transmission and a third means for transmission, said first means for transmission is constituted with a group of gears that communicate a rotating driving force imparted by said motor;

said means for timing setting, which is linked to said first means for transmission, sets timing with which said means for tape joining is driven and timing with which said means for cutting is operated;

said second means for transmission is provided between said means for timing setting and said means for tape joining so that said second means for transmission drives said means for tape joining with said timing set by said means for timing setting; and said third means for transmission is provided between said means for timing setting and said means for cutting so that said third means for transmission drives said means for cutting with said timing set by said means for timing setting.

7. A tape feeding apparatus according to claim 6, wherein:

said means for timing setting causes said means for cutting to operate after a period of time over which said means for tape joining is driven is completed.

8. A tape feeding apparatus according to claim 7, wherein:

said means for timing setting is provided with a means for setting operating timing for said motor.

9. A tape feeding apparatus according to claim 1, wherein:

said cutter includes a front end facing said tape laminate for cutting said tape laminate when said cutter is in a cutting position, said cutter does not cut tape laminate when said cutter is in a non-cutting position, and wherein said means for separating said tape laminate from said cutter is provided with a spring arm portion having a front end which projects out further towards said tape laminate than said front end of said cutter when said cutter is in said non-cutting position, said front end of said cutter projects out further towards said tape laminate than said front end of said spring portion when said cutter is in said cutting position, said means for separating positioned between said cutter and said means for tape joining, said spring arm separates said tape laminate attached to said cutter upon said cutter returning to said non-cutting position.

10. A tape feeding apparatus according to claim 1, wherein said means for cutting includes a base body having a front edge and a width terminating in first and second opposite side edges, and a blade edge formed along said front edge of said base body, wherein said blade edge includes first and second peak portions, said first peak portion positioned at said first opposite side edge of said width of said base body and said second peak portion positioned at said second opposite side edge of said width of said base body and an vertex of a V-shaped valley portion positioned between said first and second peak portions.

11. A tape feeding apparatus according to claim 10, wherein said blade edge includes first and second inclining surfaces, said first inclining surface extending from said first peak portion to said vertex of said V-shaped valley portion inclined at an angle within a range of 15° to 75° relative to said first opposite edge of said width of said base body, and said second inclining surface extending from said second peak portion to said vertex of said V-shaped valley portion inclined at an angle within a range of 15° to 75° relative to said second opposite edge of said width of said base body.

* * * * *